April 19, 1938.  J. BOWEN  2,114,586

CASTER CONTROL MEANS FOR MOVABLE TRUCKS AND THE LIKE

Filed Oct. 16, 1936  2 Sheets-Sheet 1

INVENTOR
James Bowen.

WITNESS
F. J. Hartman.

BY George K. Stellert
ATTORNEY

April 19, 1938.    J. BOWEN    2,114,586
CASTER CONTROL MEANS FOR MOVABLE TRUCKS AND THE LIKE
Filed Oct. 16, 1936    2 Sheets—Sheet 2
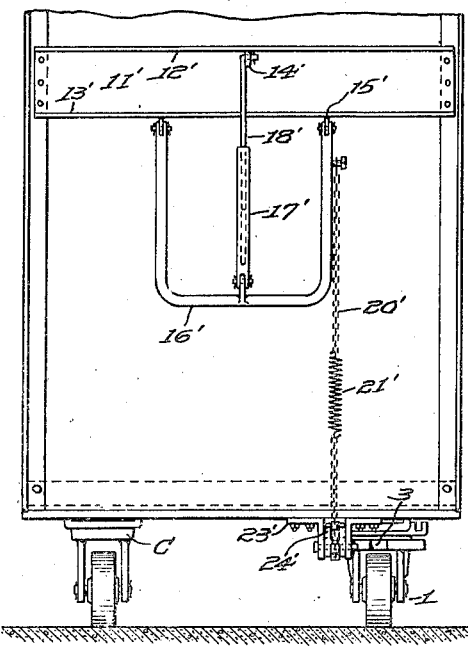
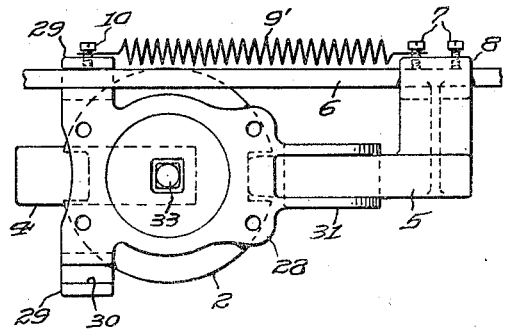
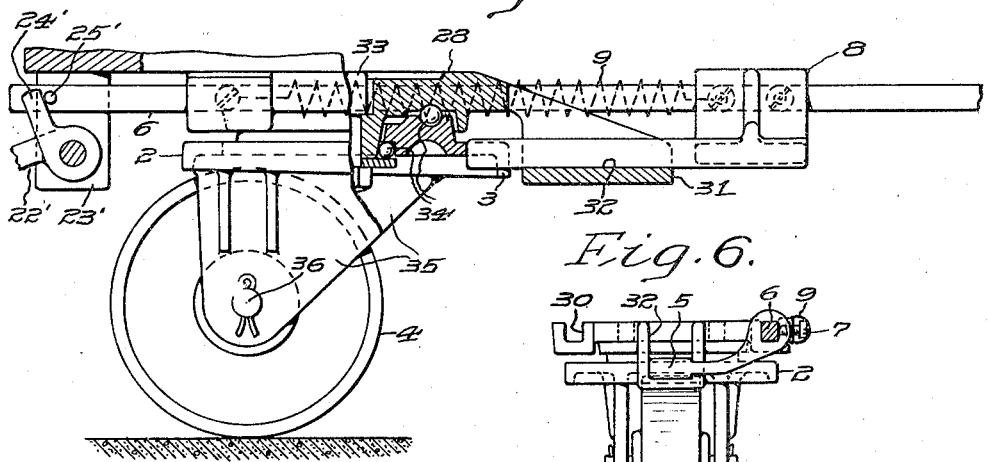
INVENTOR
James Bowen.
WITNESS
F. J. Hartman.

Patented Apr. 19, 1938

2,114,586

UNITED STATES PATENT OFFICE 2,114,586

CASTER CONTROL MEANS FOR MOVABLE TRUCKS AND THE LIKE

James Bowen, Manheim, Pa., assignor to Charles Bond, Philadelphia, Pa.

Application October 16, 1936, Serial No. 105,870

10 Claims. (Cl. 280—49)

This invention relates to movable trucks, racks and similar vehicles for transporting articles over short distances, such as about a shop or mill, and is especially directed to the provision in a truck or the like having swivel casters of means associated with a longitudinal aligned pair of the casters for selectively locking one of them in position to facilitate control of the direction of movement of the truck.

As is well known, when all the casters on a truck of this general character are free to swivel it is difficult to control with accuracy its direction of movement, especially when it is being pushed from the rear, and my invention therefore contemplates the locking of a caster at the leading end of the truck so as to constrain the wheel of this caster to rotate only in a plane parallel to the sides of the truck and thereby facilitate accurate control of its direction of travel when it is being manipulated from the opposite end. The invention further contemplates the provision at each end of the truck of a folding push bar which when in operative position affords a convenient hand grip for the operator when moving and guiding the truck and which automatically brings about the locking of a caster at the opposite end as the bar is brought to that position or subsequently thereto and automatically unlocks it when returned to inoperative position.

A principal object of the invention, therefore, is to provide in a truck or similar vehicle a pair of swivel casters and control means associated therewith operable from either end of the truck to lock the caster at the opposite end in such manner as to constrain its wheel to rotate only in a plane parallel to the sides of the truck.

A further object is to provide mechanism including a push bar attached to the truck which is effective when brought to operative position to actuate the caster locking mechanism to automatically lock one caster in the position mentioned and when returned to inoperative position to automatically release it and thereby unlock such caster.

Another object of the invention is to provide casters and control mechanism of the character described in which the caster locking means are brought to potentially locked condition simultaneously with the placing of the push bar in position for moving the truck even though the caster to be locked is not in position therefor and which are thereafter operative to lock the caster automatically upon its being brought to such position by movement of the truck or otherwise.

Other objects, purposes and advantages of the invention will hereinafter more fully appear or will be understood from the following description of a four caster truck equipped with a preferred embodiment thereof as illustrated in the accompanying drawings, wherein Fig. 1 is a side elevation, partly in vertical section, of the truck;

Fig. 3 is a left hand end view thereof;

Fig. 4 is an enlarged fragmentary detail in side elevation, partially in vertical section, showing the caster, and a portion of the locking mechanism and truck body adjacent the lower left hand corner of the truck;

Fig. 5 is a fragmentary top plan view of the caster and locking mechanism shown in Fig. 4 but on a smaller scale, and Fig. 6 is an end elevation looking from the right of Fig. 5.

In the several figures like characters are used to designate the same parts.

Figure 1:
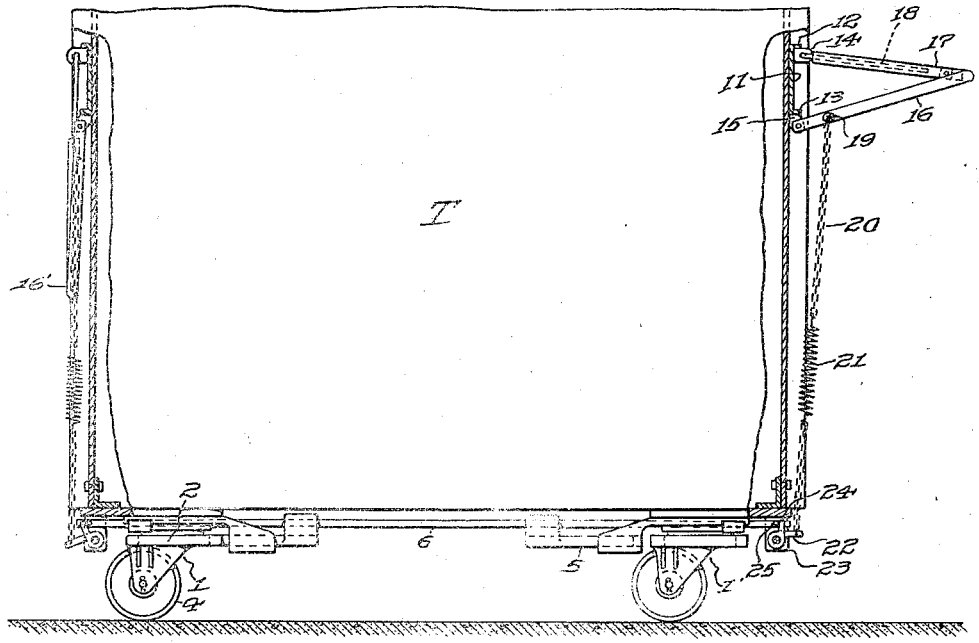

More particularly the truck T, the detailed construction of which is not material, may be considered as representing any truck or other vehicle adapted for support from swivel casters and is provided with four such casters respectively located adjacent its several corners. Two of the casters C, C' may be of any desired character and require no specific reference since they form no part of the invention, while each of the other pair 1, 1' hereinafter more fully described, comprises a swivel plate 2 having a pair of diametrically opposed substantially rectangular notches 3 disposed in the plane of rotation of its caster wheel 4. These notches are selectively adapted for the reception of one end of a locking dog 5 which when inserted in either notch, prevents movement of the swivel plate about its axis and thus maintains the plane of rotation of the wheel parallel with the sides s of the truck.

Figure 2:
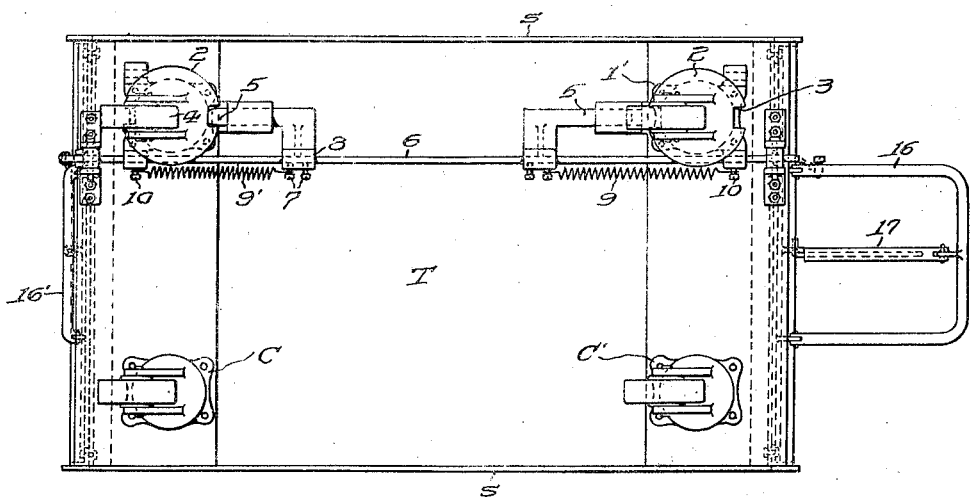
Fig. 2 is a bottom plan view thereof.

The locking dogs respectively associated with each of the casters 1, 1' are of substantially similar but reverse construction and are carried on a locking rod 6, which is supported from and extends adjacent these casters beneath the truck body and terminates just within its ends; the dogs are secured to this rod by set screws 7 threaded into collars 8, integral with the dogs, through which the rod 6 is inserted during assembly. The spacing of the locking dogs along the rod, as clearly shown in Fig. 2, is such that when either dog is entered in a notch of its adjacent swivel plate the other dog is entirely free of contact with its swivel plate and when the rod is in neutral position neither dog contacts either plate, and oppositely disposed tension springs 9, 9' respectively extending between the locking dogs and their adjacent casters constantly urge the dogs and rod toward this neutral position.

Substantially identical operating mechanisms for the rod 6 are disposed at either end of the truck and the several parts of each are therefore designated by like numerals with the addition of a prime (') to distinguish between those at opposite ends; a specific description of one of said mechanisms will therefore suffice.

Thus, a plate 11 or other suitable portion of the truck body provides flanges 12 and 13 to the former of which is secured substantially at its midpoint a lug 14, and to the latter a pair of similar lugs 15 equally spaced laterally from its center. A U-shaped tubular push bar 16 is pivoted at its ends to the lugs 15 and has one end of tubular brace 17 pivoted to it at its midpoint while a solid bracing rod 18 is pivoted to the lug 14 to slide within the brace 17 as the push bar is raised or lowered, thus guiding the free end of the brace into engagement with the lug 14 to limit the upward movement of the push bar.

A pin 19 is secured to one of the arms of the push bar a short distance from its pivoted end and a suitable, preferably flexible, tension member such as a chain 20, in which is interposed a tension spring 21, extends downwardly from this pin to form an operative connection between the push bar and caster locking mechanism.

The lower end of the chain is connected to one arm of a crank lever 22 pivotally supported on brackets 23 attached to the bottom of the truck body. The other arm of this lever is bifurcated to form a fork 24 loosely embracing the adjacent end portion of the locking rod 6, and bearing against a pin 25 projecting transversely through the latter to form a uni-directional operative connection for transmitting motion between the fork and the rod.

The caster 1 which is shown in Figs. 4-6 in enlarged detail comprises a base plate 28 adapted to be secured to the bottom of the truck and desirably forged or cast in one piece. Each plate carries an outwardly projecting integral lug 29 having in its upper surface a groove 30 adapted to loosely receive and support the rod 6; only one such rod is employed, however, so that actually but one of these lugs is required on each caster, but for convenience in manufacture and assembly two of them are preferably provided and arranged on opposite sides of the plate so they can be used interchangeably at the opposite ends of the truck, the groove in the right hand lug receiving the rod 6 at one end and that in the left hand lug receiving it at the other.

At the opposite end of the base plate is an integral projection 31 which is shaped to form a trough 32 which slidably supports the locking dog 5 for movement toward and away from the pivotal center of the swivel plate 2. This plate is secured to the center of the base plate for rotative movement with respect thereto by means of a king bolt 33 and the usual washer and nut, with anti-friction bearings 34 interposed in suitable races between the plates and between the base plate and washer, while downwardly depending ears 35 integral with the swivel plate support the axle 36 of the caster wheel located between them. Consequently when the base plate is free to swivel through the absence of engagement of the locking dog 5 in one of its notches 3 it may rotate freely on the anti-friction bearings 34 and the plane of rotation of the wheel 4 is thus subject to change at any time as in ordinary swivel casters.

As shown in the drawings, however, the locking mechanism is in position such that the swivel plate of caster 1 is locked by the adjacent dog 5 so that its wheel can rotate only in a plane parallel with the sides of the truck, a condition due to the push bar at the opposite end of the truck being raised to position for use, since the raising of either push bar to such position, as hereinbefore noted, results in the locking of the caster at the opposite end.

The specific operations which thus lock the caster when the push bar is raised result from the pull exerted on the chain 20 as the bar is swung upwardly on its pivots; this pull is imparted to the adjacent crank lever 22 to move it about its pivot and cause the fork 24 to push the pin 25 and hence rod 6 and dogs 5, toward the opposite end of the truck. The spring 21 associated with the raised push bar is of course sufficiently strong to overcome the tension of the spring 9, while the corresponding spring 21' is slack, since its push bar is lowered, and consequently, if a notch in the plate 2 is in proper alignment for the reception of dog 5, the latter moves thereinto immediately upon the lifting of the push bar. If, however, the plate is not so aligned, the dog merely bears against its edge and spring 21 is placed under greater tension until, through movement of the truck or otherwise, a notch becomes aligned with the dog, whereupon, under the influence of the spring it snaps into locking position. The caster thereafter remains locked until the push bar is released and allowed to fold downwardly against the end of the truck thereby relieving the tension on spring 21 so that rod 6 is then free to move under the influence of spring 9 which promptly restores it to neutral position and withdraws dog 5 from the plate notch. However, spring 9 is prevented by its balanced adjustment against spring 9' from drawing the rod beyond this point, and the swivel plates of both casters therefore are free to swivel until a push bar is again raised to lock one of them.

When the locking mechanism is in this neutral or wholly inoperative position with both push bars folded substantially flat against the truck ends a number of trucks may be placed end to end in a minimum of space, while, of course, when the push bar at either end of the truck is similarly folded, that end may be moved up close against a wall such as the rear wall of a proofing oven or the like.

It will further be apparent that the transverse portions of the push bars when the latter are raised lie at a relatively considerable distance from the ends of the truck with the result that when it is being moved about by an operative through the medium of either push bar, it is substantially impossible for him to either pull the adjacent casters of the truck upon his feet or to contact the ends of the truck with his legs so that the danger of accidents of this nature which is constantly present when it is necessary for the operative to take hold of the end of the truck to move it about is substantially eliminated. Additionally when an operative takes hold of the end of a truck of ordinary construction preparatory to moving it he usually places one hand and sometimes both at its corner or corners in order to guide it, and thus in a position in which they are very likely to be injured by contact with walls, other trucks or similar objects, but in trucks embodying my invention the operative's hands are protected from this hazard since the push bar in which they are placed lies well within the planes of the sides of the truck. Moreover, the simple operation of raising either push bar to operative position is always effective to either immediately lock the caster controlled thereby at the opposite end of the truck or else to place the locking mechanism in potential locking position so that the moment either notch in the caster swivel plate aligns with the dog the caster is automatically locked without any attention on the part of the operator. The mechanism of my invention therefore is of a character readily utilized by unskilled labor and not only facilitates proper control of the truck but tends to reduce the liability of accident to the operative while he is moving it.

While I have herein described a preferred embodiment of the invention with considerable particularity and with special reference to elements of specific form and construction, it will be understood that I do not thereby desire or intend to limit or confine myself in any way thereto as changes and modifications therein and in the form and arrangement of the several parts will readily occur to those skilled in the art and may be made if desired without departing from the spirit and scope of the invention as defined in the appended claims.

Having thus described my invention, I claim and desire to protect by Letters Patent of the United States:

1. In combination with a truck of the class described, a pair of swivel casters having notched swivel plates, a longitudinally slidable rod, locking dogs interconnected with the rod respectively adapted to enter the notches in the plates, a crank lever mounted adjacent each end of the rod operable to move it longitudinally in response to a movement of the lever, a push bar pivoted adjacent each end of the truck and a tension member between each bar and the adjacent lever operable to actuate the latter in response to movements of the bar.

2. In combination with a truck of the class described, a pair of swivel casters having notched swivel plates, a longitudinally slidable rod, locking dogs interconnected with the rod respectively adapted to enter the notches in the plates, a crank lever mounted adjacent each end of the rod operable to move it longitudinally in response to a movement of the lever, and means carried by each end of the truck comprising a movable push bar and a longitudinally yieldable tension member interconnecting the push bar and the adjacent lever operable to actuate said lever to move the rod and thereby effect engagement of the locking dog adjacent the opposite end of the truck with the swivel plate of the corresponding caster.

3. In combination with a truck of the class described, a pair of swivel casters having notched swivel plates, a longitudinally slidable rod, locking dogs carried by the rod respectively adapted to enter the notches in the plates, a push bar disposed adjacent each end of the truck movable between operative and inoperative positions and connections between each push bar and the adjacent end of the rod for urging the latter longitudinally when the bar is moved to operative position to thereby move the locking dog adjacent the opposite end of the rod into locking relation with the swivel plate of the corresponding caster when said plate is in a predetermined position and to move it into potentially locked relation thereto when the plate is in any other position, such connection including yielding means for automatically moving the bar and the locking dog from potentially locked position to locking position upon swivelling of the plate into said predetermined position after the locking dog is in potentially locked position.

4. In combination with a truck of the class described, a pair of swivel casters having notched swivel plates, a longitudinally slidable rod, locking dogs interconnected with the rod respectively adapted to enter the notches in the plates, and so positioned relatively thereto as to be selectively capable of entering a notch in the corresponding swivel plate when such notch is aligned therewith and to engage the edge of the swivel plate in the absence of such alignment, and, disposed adjacent each end of the truck, a tensionable member interconnected with the adjacent end of the rod and means operable to place it under axial tension to urge the rod and dogs toward the opposite end of the truck, each member, when tensioned, being operative to move the dog adjacent said opposite end toward its corresponding swivel plate and into engagement therewith in the absence of said alignment and to thereafter automatically move the dog into the notch in said plate upon attainment of said alignment.

5. In combination with a truck of the class described, a pair of swivel casters having notched swivel plates, a longitudinally slidable rod, locking dogs interconnected with the rod respectively adapted to enter the notches in the plates, a U-shaped push bar disposed adjacent each end of the truck having the ends of its arms pivoted thereto for movement about a horizontal axis, a tension member including yielding means secured to each bar adjacent its pivotal axis and extending downwardly therefrom, and an operative connection between the lower end of each tension member and the adjacent end of the rod adapted to urge the rod to move longitudinally when either push bar is swung upwardly about its said axis.

6. In a truck of the class described a pair of swivel casters having notched swivel plates, a locking dog associated with each caster respectively adapted to enter any notch in its swivel plate, a rod extending longitudinally of the truck adjacent the casters interconnected with the locking dogs, a pair of oppositely disposed springs arranged to respectively urge the dogs and the rod in opposite directions and means disposed adjacent each end of the truck respectively operable to yieldingly urge the rod longitudinally against the bias of one of the springs to thereby engage the dog adjacent the opposite end either with the edge of the swivel plate of its associated caster or with a notch therein in accordance with rotative position of the plate.

7. In a truck of the class described, a pair of swivel casters respectively disposed adjacent the ends of the truck, locking means selectively adapted to lock either caster against swivelling comprising a longitudinally slidable rod, locking dogs interconnected therewith, a U-shaped push bar carried by each end of the truck and means interconnecting each push bar with the adjacent end of the rod including a tension member having interposed yielding means adapted upon actuation of either push bar to urge the rod longitudinally and thereby bring one of the dogs into position for locking a caster adjacent the opposite end of the truck.

8. In a truck having a pair of casters disposed adjacent its ends each comprising a notched swivel plate and a locking dog adapted to enter a notch therein to lock the plate against swivelling, yielding means operative to urge each dog toward its associated plate, a longitudinally slidable rod connecting the dogs and having an abutment adjacent each of its ends, a lever pivoted adjacent each end of the truck operable to engage the adjacent abutment to urge the rod longitudinally, and manually operable means disposed adjacent each lever and comprising a movable push bar and yielding tension means interconnected therewith adapted to move such lever and the rod in a direction to cause the dog adjacent the opposite end of the truck to engage its associated swivel plate.

9. A truck comprising a plurality of swivel casters, one caster adjacent each end having a notched swivel plate, a rod slidable longitudinally of the truck, locking dogs interconnected with the rod respectively adapted on movements of the rod in opposite directions to selectively enter said notches to lock and unlock the plates of their respective casters against swivelling, and actuating means disposed adjacent each end of the rod comprising a pivoted lever, means carried by the rod for engagement by the lever, a push bar pivoted to the truck and a tension member extending between the push bar and the lever yieldingly operable to move the lever in response to movement of the push bar and in a corresponding direction.

10. A truck comprising a plurality of swivel casters, one caster adjacent each end having a notched swivel plate, a rod slidable longitudinally of the truck, locking dogs interconnected with the rod respectively adapted on movements of the rod in opposite directions to selectively enter said notches to lock and unlock the plates of their respective casters against swivelling, mutually opposed yielding means remote from the ends of the rod adapted to normally maintain the dogs out of engagement with the swivel plates, and actuating means for the rod adjacent each end of the truck respectively operable to yieldingly urge the rod in opposite directions in opposition to one of said yielding means to thereby engage the dog remote from such actuating means with the edge of its associated swivel plate or in a notch therein.

JAMES BOWEN.